Patented Mar. 19, 1935

1,995,119

UNITED STATES PATENT OFFICE 1,995,119

SOLID SEASONING COMPOSITION CONTAINING CAPSICUM AND CHLORIDE

Carroll L. Griffith and Lloyd A. Hall, Chicago, Ill., assignors to The Griffith Laboratories, Inc., Chicago, Ill., a corporation of Illinois No Drawing. Application June 16, 1934, Serial No. 730,908

18 Claims. (Cl. 99—11)

The present invention relates to a flavoring composition containing oleo-resin of capsicum and a chloride of an alkali metal. It has particular reference to a solid composition in which there are crystals of a chloride salt, with or without other solid particles, as a vehicle, or base, or carrier, for oleo-resin of capsicum with or without other flavoring materials, particularly essential oils.

In flavoring meats for use in sausages, Frankfurters, bologna, meat-loaf and the like, it is customary to use prepared seasonings which are derived from the natural substances, but which are devoid of fiber from the natural sources. Essential oils, extracts, oleo-resins, and like substances are compounded with a suitable solid carrier, to form a bulky granular mass compounded specially with reference to certain formulas. Sugar is a common vehicle for such a carrier. Salt is desirable, but in some instances it is avoided as will hereinafter appear. Sugar may create too much sweetness. Salt alone, or mixtures of salt and sugar, or salt and other substance may be used in certain cases. However, when oleo-resin of capsicum is present, sodium chloride is undesirable. The combination without a suitable correcting agent leads to a slow bleaching out of the color of the capsicum. Bleaching occurs in the absence of essential oils, but it is even greater when essential oils are present. The present invention applies a corrective agent permitting use of various combinations without the undesirable bleaching.

Oleo-resin of capsicum on exposure to air has an increasing acid content. It is apparently a condition caused by oxidation in which acid substance is formed. Such capsicum has a characteristic red-orange color by which its presence is indicated to the eye. This color has a valuable function of indicating to the trade the use of natural capsicum substance, and of capsicum in oleo-resin form.

Functionally, salt in the vehicle may be used. But commercially, where a seasoning ingredient having sodium chloride and a colored oleo-resin of capsicum is an item of commerce, there are conditions which bar such mixtures from successful use in trade. A composition containing sodium chloride and colored oleo-resin of capsicum is originally of a uniform capsicum color. On standing for several months the color bleaches out. The bleaching is first noticeable in about three weeks. The parts most exposed to air bleach first, and faster, thus giving an appearance of great change, and of irregular change. The product may be mottled in various shades of color from the original capsicum color to a highly bleached capsicum color. All these changes create in the mind of the user a prejudice to the material. Complaints of spoilage may arise. The user is fearful of loss of strength and hence in fear that the cannot make a standard meat product from such a composition designed to meet his regular formulas.

Commercially, these compositions also have essential oils of spices. These are aromatic substances of which the active principles are identified as certain types of chemical compounds having reactive groups, such as aldehydes, phenols, alcohols, ketones, terpenes, and derivatives of these such as esters. For example oil of cloves has eugenol, a phenol. Oil of Cassia contains cinnamic aldehyde. Terpenes occur in oils of sage, thyme, juniper. Terpineol is found in oil of lemon. Alcohols such as borneol and linalol are found in oil of coriander. N-decylic aldehyde occurs also in oil of coriander.

The present invention is based upon the discovery that acid or other reactive constituent in the oleo-resin of capsicum, or in other oleo-resins, or in other oils or materials which are present originally when the seasoning composition is made, or acids which may be later formed, have a certain action in the presence of chloride salt to form some active substance capable of bleaching the color imparted to the seasoning composition by the original oleo-resin of capsicum. The intermediate reactions involved are not fully comprehended, nor are they material. On the basis that it occurs always in the presence of acid coupled with the presence of a chloride salt and of oleo-resin of capsicum to produce a bleaching condition evidenced by change in appearance, the present invention aims to overcome this condition by adding a suitable corrective agent which prevents the bleaching, and hence the change in appearance.

The general object of the invention is to neutralize an acid condition in the seasoning composition.

Another object of the present invention is to use inorganic alkali substance to neutralize acid which is present or is formed in the seasoning composition containing chloride and oleo-resin of capsicum.

It is another object of the invention to make a solid flavoring composition containing oleo-resin of capsicum and sodium chloride particles which are specially produced in special powder-like microscopically crystalline form, as the whole or as part of the solid base for flavoring ingredients.

In using an inorganic base, numerous metals are available which are not harmful in foods in the quantities needed. Sodium, lithium, potassium, magnesium and calcium are the most common suitable ones, but this list is not an exclusive one. The oxides, carbonates, hydroxides and bicarbonates are common forms for these metals for such uses. Commonly the alkali metals, such as potassium and sodium are used as carbonates or as bicarbonates, because the oxides and hydroxides are too powerful as lyes to warrant safety in using them, as is well known. Magnesium and calcium may be used also in a carbonate form, but preferably the oxides or hydroxides of each may be used, or even the mixed or complex oxides or hydroxides containing both magnesium and calcium may be employed. Inorganic bases of the character described unite with the acid initially present, or formed, either in the oleo-resins or oils, or as a result of action of such acids on the chloride.

Because a chloride such as sodium chloride is herein made a new ingredient in successful seasoning compositions, some attention may advantageously be given to it. Heretofore, so far as known, such compositions of unsuccessful nature wherein sodium chloride salt has been employed have been made with sodium chloride crystals, produced by grinding of large crystals, or produced by crystallization processes from a mother brine or in other words, from ordinary commercial sodium chloride.

According to one feature of the present invention the form of the salt may be improved to give an improved character to the composition. This improvement in the mass is greatest when all or a very large proportion of base or vehicle is sodium chloride. The common crystal form of sodium chloride is first destroyed by dissolving the salt in water to form a strong brine. The brine is then subjected in subdivided form, as a spray or a thin film, to a rapid or "flash" evaporation process whereby new salt particles are obtained having a more beneficial form for use in the present invention.

The preferred manner of forming the salt base is to make a brine of about 27% sodium chloride. This is heated to about 180° F. and is sprayed or splashed onto hot revolving rolls or drums having a temperature of about 285° F. to 300° F. A fine powder forms on the rolls which falls off or is scraped off. The powder appears to the eye as amorphous, but in fact it is microscopically crystalline. To the fingers it feels soft and flaky and unlike ground salt crystals. In the microscope it indicates the presence of the usual cubic crystal lattice of sodium chloride. The fine powder form provides a high specific surface for holding the seasoning ingredients, making a higher maximum safe capacity for liquid additions without settling of liquid from solid. The fine powder form also provides more spaces of capillary proportions in which liquid and semi-liquid substance may be housed.

The use of a corrective agent in the original composition makes it permissible to increase the contact area between sodium chloride and the material containing the oleo-resin of capsicum. In the absence of such corrective agent the use of the improved crystal form would only hasten the undesirable bleaching action.

Of course, the invention is not limited to use of salt made as above described. Ordinary salt grains, or ground forms of salt crystals may be used. Ordinary salt crystals may be ground in the presence of other material, preferably all of the material, which is to enter into the ultimate composition. Sugar, which is a normal seasoning ingredient, or other crystals, also may be present with or without employment of such grinding step.

In selecting salt, it is desirable to use a pure salt or one which is not so impure as to have the property of absorbing moisture from the air, or from other materials. This tends to dissolve salt and to provide a medium for easy distribution of acid or other soluble substance which is effective in bleaching. Where the salt is made into powder form by the hot rolls as above described it is desirable to let it stand exposed to the air for a sufficient length of time to allow the salt powder to arrive at an equilibrium condition, as to moisture content. Thus caking of the ultimate mass may be prevented. However, where some residual moisture is left in the salt or is allowed to accumulate in the salt, a suitable agent may be added which prevents undue caking.

Glycerin or corn sugar may advantageously be mixed into the salt-base mass as a protective agent to minimize any tendency to cake. Such addition is more particularly desirable where the fine powder-like particles of sodium chloride are used. When glycerin is so used, it acts as a fixative agent to dissolve volatile material and lessen loss of it by evaporation. Fixative agent other than glycerin or its equivalent such as well known edible or harmless fats and oils may be employed in place of or in combination with glycerin to secure the well known advantages of such use singly, or the use as so combined. Such functions are known in the Allen Patent No. 1,829,431, and in the application of Carroll L. Griffith (joint applicant herein), Serial No. 519,686, filed March 2, 1931, now Patent No. 1,971,910, issued August 28, 1934.

It is not intended to indicate that the acid which acts upon the chloride arises entirely, or at all necessarily, in the oleo-resin of capsicum. Other oils or other substances may be present which in themselves are sufficiently acid, or which on standing in a seasoning composition may produce an acid condition sufficient to act in the presence of chloride and thereby produce the said bleaching condition evidenced by the change of color in the oleo-resin of capsicum.

While it is not known exactly what the conditions are, it is evident that the oleo-resin of capsicum, with or without other flavoring materials, in the absence of chloride is not bleached. The non-bleaching action of an uncorrected mixture may be rapid or slow and frequently becomes apparent in about three weeks. It is usually complete in a few months. It is therefore possible that a trace of chlorine is gradually released, and as it is used up to bleach, more is formed. It is also possible that the chloride, or even hydrochloric acid, or the chlorine ion is a catalyst for an air oxidation to bleach the mass. At least, it is known that the presence of an inorganic neutralizing agent of the kind described is effective to prevent the bleaching.

Suitable compositions are given below and these may be made in the several manners above described, and preferably from the salt powder or the "processed salt" above described.

Example I

| | Per cent |
|---|---|
| Sodium chloride | about 93.00 |
| Magnesium hydroxide | 2.35 |
| Glycerin | 1.25 |
| Oleo-resins of capsicum | 2.10 |
| Essential oils of spices | 1.25 |

Example II

| | Per cent |
|---|---|
| Sodium chloride | 94.00 |
| Sodium sesqui-carbonate | 1.40 |
| Corn oil | 1.25 |
| Oleo-resins of capsicum | 2.10 |
| Essential oils of spices | 1.25 |

Example III

| | Per cent |
|---|---|
| Sodium chloride | 93.05 |
| Calcium carbonate | 2.35 |
| Glycerin | 1.25 |
| Oleo-resins of capsicum | 2.10 |
| Essential oils of spices | 1.25 |

Example IV

| | Per cent |
|---|---|
| Sodium chloride | 92.65 |
| Magnesium oxide | 2.00 |
| Corn sugar | 2.00 |
| Oleo-resins of capsicum | 2.10 |
| Essential oils of spices | 1.25 |

Example V

| | Per cent |
|---|---|
| Sodium chloride | 75.00 |
| Sodium bicarbonate | 2.00 |
| Corn sugar | 18.40 |
| Glycerin | 1.25 |
| Oleo-resins of capsicum | 2.10 |
| Essential oils of spices | 1.25 |

Example VI

| | Per cent |
|---|---|
| Sodium chloride | 46.50 |
| Spray milk powder | 46.50 |
| Magnesium hydroxide | 2.40 |
| Glycerin | 1.25 |
| Oleo-resins of capsicum | 2.10 |
| Essential oils of spices | 1.25 |

Among the common flavoring materials used where meats are to be flavored are, oleo-resin of ginger, oil of coriander, oil of nutmeg, oil of cloves, oil of Cassia, oil of allspice, oil of ginger, and yet others.

It is of course to be understood that the formulas may be changed in many ways without departing from the spirit and scope of the invention as set forth in the appended claims.

We claim:

1. The method of preventing a mixture containing colored oleo-resins of capsicum and solid sodium chloride from early bleaching out in respect to the color of said oleo-resins, which comprises intimately mixing said chloride, said oleo-resins of capsicum, and a substance having available therein alkali for neutralization of acid.

2. A solid seasoning composition containing in combination a sodium chloride, colored oleo-resins of capsicum, and substance having available therein alkali for neutralizing acid, whereby the action of the alkali of said substance avoids early bleaching of the color of said oleo-resins of capsicum.

3. A solid seasoning composition containing essential oils and a combination of a sodium chloride, colored oleo-resins of capsicum, and substance having available therein alkali for neutralizing acid, whereby the action of the alkali of said substance avoids early bleaching of the color of said oleo-resins of capsicum.

4. A solid seasoning composition containing in combination sodium chloride, colored oleo-resins of capsicum, and free alkali, whereby the alkali may react with acid to avoid early bleaching of the color of said oleo-resins of capsicum.

5. A solid seasoning composition containing essential oils and a combination of sodium chloride, colored oleo-resins of capsicum, and free alkali, whereby the alkali may react with acid to avoid early bleaching of the color of said oleo-resins of capsicum.

6. A solid seasoning composition containing in combination sodium chloride, colored oleo-resins of capsicum, and soluble inorganic alkali, whereby the alkali may react with acid to avoid early bleaching of the color of said oleo-resins of capsicum.

7. A solid seasoning composition containing in combination sodium chloride, colored oleo-resins of capsicum, and relatively insoluble inorganic alakli, whereby the alkali may react with acid to avoid early bleaching of the color of said oleo-resins of capsicum.

8. A solid seasoning composition containing in combination sodium chloride, colored oleo-resins of capsicum, and a carbonate of a metal, whereby the alkali may react with acid to avoid early bleaching of the color of said oleo-resins of capsicum.

9. A solid seasoning composition containing in combination sodium chloride, colored oleo-resins of capsicum, and an oxide of a metal, whereby the alkali may react with acid to avoid early bleaching of the color of said oleo-resins of capsicum.

10. A solid seasoning composition containing in combination sodium chloride, colored oleo-resins of capsicum, and a hydroxide of a metal, whereby the alkali may react with acid to avoid early bleaching of the color of said oleo-resins of capsicum.

11. A solid seasoning composition containing in combination sodium chloride, colored oleo-resins of capsicum, and a soluble carbonate of a metal, whereby the alkali may react with acid to avoid early bleaching of the color of said oleo-resins of capsicum.

12. A solid seasoning composition containing in combination sodium chloride, colored oleo-resins of capsicum, and a relatively insoluble carbonate of a metal, whereby the alkali may react with acid to avoid early bleaching of the color of said oleo-resins of capsicum.

13. A solid seasoning composition containing in combination sodium chloride, colored oleo-resins of capsicum, and a relatively insoluble oxide of a metal, whereby the alkali may react with acid to avoid early bleaching of the color of said oleo-resins of capsicum.

14. A solid seasoning composition containing in combination sodium chloride, colored oleo-resins of capsicum, and a soluble oxide of a metal, whereby the alkali may react with acid to avoid early bleaching of the color of said oleo-resins of capsicum.

15. A solid seasoning composition containing in combination sodium chloride, colored oleo-resins of capsicum, and a soluble hydroxide of a metal, whereby the alkali may react with acid to avoid early bleaching of the color of said oleo-resins of capsicum.

16. A solid seasoning composition containing in combination sodium chloride, colored oleo-resins of capsicum, and a relatively insoluble hydroxide of a metal, whereby the alkali may react with acid to avoid early bleaching of the color of said oleo-resins of capsicum.

17. A solid seasoning composition containing essential oils, a fixative therefor, and the combination of sodium chloride, colored oleo-resins of capsicum, and available alkali for neutralization of acid, whereby action of the alkali avoids early bleaching of the color of said oleo-resins of capsicum.

18. A solid seasoning composition containing essentially as a solid vehicle base or carrier finely divided sodium chloride, and containing the essential combination therewith of colored oleo-resins of capsicum and available alkali for neutralization of acid, whereby action of said alkali avoids early bleaching of the color of said oleo-resins of capsicum.

CARROLL L. GRIFFITH.
LLOYD A. HALL.